Feb. 5, 1957  G. S. NALLE, JR  2,780,259
PLASTIC DISH WITH COVER CONNECTION
Filed Sept. 13, 1954
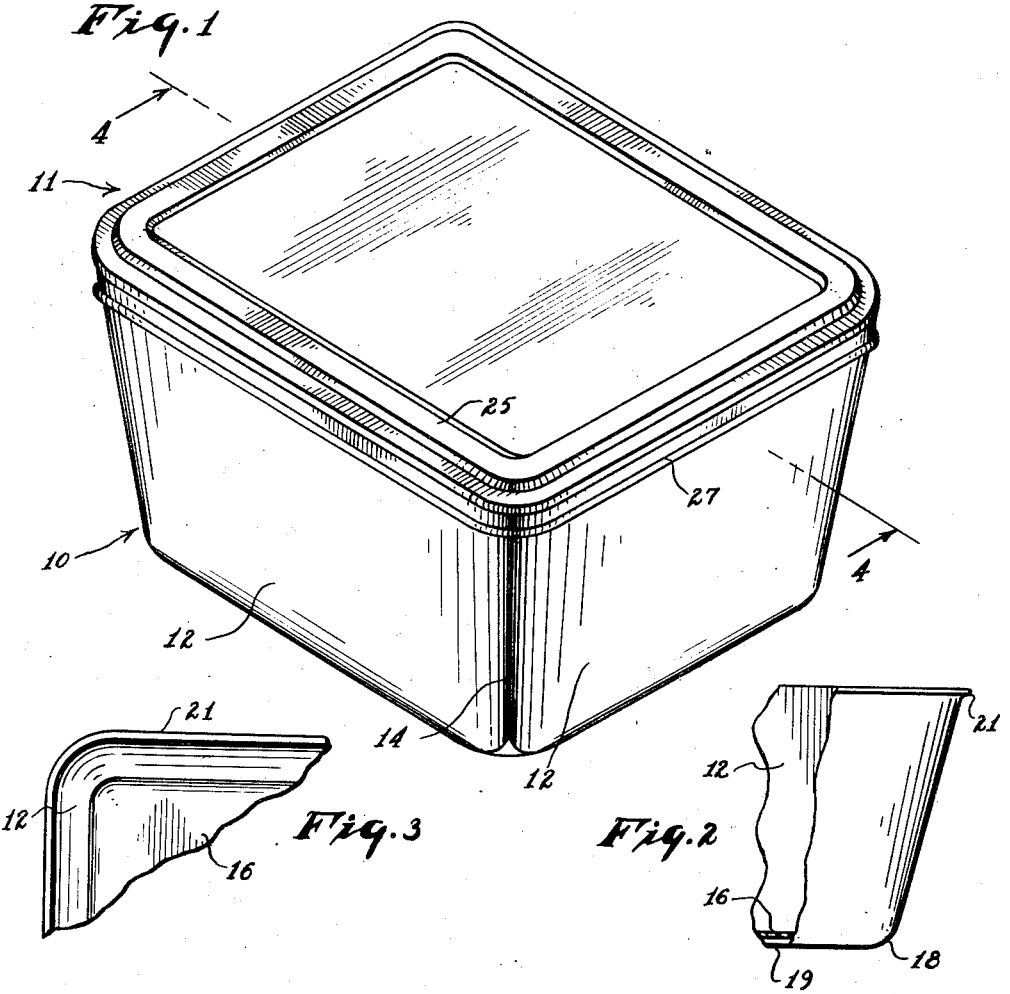
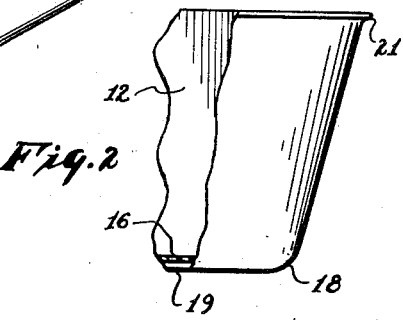
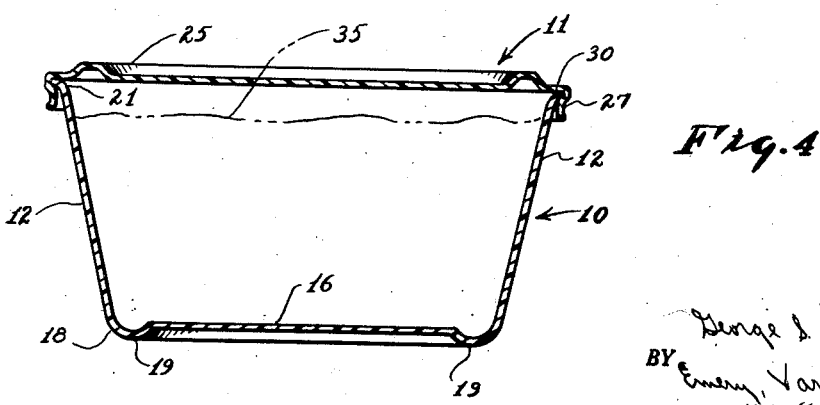
INVENTOR.
George S. Nalle, Jr.
BY Emery, Varney,
Whittemore & Dix
ATTORNEYS

United States Patent Office 2,780,259
Patented Feb. 5, 1957

2,780,259

PLASTIC DISH WITH COVER CONNECTION

George S. Nalle, Jr., Austin, Tex.

Application September 13, 1954, Serial No. 455,393

5 Claims. (Cl. 150—.5)

This invention relates to dishes of the type commonly used for putting food in an ice box. The invention is especially concerned with the construction of a container assembly comprising a dish and cover which are combined in such a way that the cover stays on the dish more securely than have the covers of previous dishes of similar type.

It is an object of the invention to provide an improved assembly of a dish and a cover held on the dish by the engagement of a rim and groove, one of which is on the dish and the other of which is on the cover.

In the preferred embodiment of the invention, the dish is made of plastic, and it has resilient side walls with an outwardly flaring top edge. The cover of the dish fits over the outwardly flaring top edge and has a groove in its inside wall into which the flaring edge engages to hold the cover in place. The resilience of the side walls keeps the top edge in the groove of the cover; and the weight of the contents of the dish exerts pressure against the sides of the dish to increase the pressure of the top edge against the groove within the cover.

This construction makes the cover stay on more securely. It is even possible to pick up the dish by the cover without having the cover and dish become detached from one another, and the handling of the dish is thus much more convenient when putting it into and taking it out of an ice box, or when handling it for other uses.

Other objects, features and advantages of the invention will appear or be pointed out as the description proceeds.

In the drawing, forming a part hereof, in which like reference characters indicate corresponding parts in all the views:

Figure 1 is a perspective view of a plastic dish and cover assembly made in accordance with this invention;

Figure 2 is a fragmentary view, partly broken away, showing the construction of the dish;

Figure 3 is a fragmentary, top plan view of a portion of the dish with the cover removed; and Figure 4 is a reduced scale, sectional view taken on the line 4—4 of Figure 1.

The container assembly shown in Figure 1 comprises a dish 10 having a cover 11. The dish 10 has side walls 12 and it is of generally rectangular cross section. The side walls 12 merge into one another along curved junctures 14; and the side walls 12 merge into a bottom 16 along curved junctures 18.

The bottom 16 has a recessed bottom face so that only a marginal portion 19 of the bottom contacts with the table, shelf or other supporting surface on which the dish 10 is placed. The side walls 12 slope outwardly as they extend upwardly, to outwardly flaring top edges 21 extending around the upper end of the dish 10.

The dish 10 is preferably made of plastic and it is stiff enough so that it can be handled easily without undue distortion, even when filled with food. The side walls 12 are flexible, however, so that the upper portions of the side walls can be bent inwardly in order to pass the outwardly flaring top edge 21 into the cover 11 through an entrance which is slightly smaller in cross section than the normal undistorted outline of the top edge 21.

The cover 11 can be made of rigid material, but it is preferably made of the same material as the dish 10, though often in contrasting colors for purposes of decoration. The cover 11 is shown with a ridge 25 extending around it near its perimeter for the purpose of providing additional stiffness and also for decorative effect.

The cover 11 has sides 27 which extend downwardly around its entire perimeter and each of the sides 27 has a groove 30 in its inside face for receiving the upper end of the outwardly flaring top edge of an adjacent side wall 12. In the preferred construction, the top edges of the dish 10 fully engage the grooves 30 when the sides 12 are in their normal undistorted positions.

Below the grooves 30, the sides 27 of the cover 11 converge toward one another as they extend downwardly, and provide an entrance into the cover which is of smaller cross section than the top edges of the dish 10. At their extreme lower ends, the sides 27, flare outwardly again so as to provide a flaring entrance into which the top edges of the dish 10 can enter the grooves of cover 11. This flaring entrance makes it easier to locate the cover 11 on the dish 10.

The constricted cross section of the space embraced by the sides 27 makes it impossible for the cover 11 to be removed from the dish 10, or placed on the dish 10, without distorting the outwardly flaring top edges of the side walls 12. Thus the resilience and stiffness of the side walls 12 holds the cover 11 on the dish after the cover has been pressed downwardly far enough to bring the outwardly flaring top edges of the side walls into the grooves 30.

One of the advantages of using a cover 11 which is made of plastic material, like that of the dish 10, is that the cover 11 can be distorted into tighter contact with the outwardly flaring top edges 21 when the dish is picked up. This is not necessary unless the weight of the contents of the dish are considerable and the contents consist of solid matter which does not exert any substantial pressure against the side walls 12. When the dish 10 contains jelly, sauce or any paste-like material 35, the pressure of this material against the inside surfaces of the walls 12, causes the walls to be pressed outwardly, particularly at their upper ends, and into firmer engagement with the grooves 30 of the cover 11. Thus the additional weight of material 35 in the dish 10 is compensated by a firmer grip between the cover 11 and the dish 10 for preventing the cover from coming off unintentionally when the assembly is picked up.

The preferred embodiment of the invention has been illustrated and described, but changes and modifications can be made, and some features can be used in different combinations without departing from the invention as defined in the claims.

What is claimed is:

1. A container assembly comprising a dish having bottom and side walls extending upwardly from the bottom and having outwardly flaring top edges, the bottom being polygonal and the side walls substantially straight and merging with the bottom and with each other at corners of the container, and the side walls being made of stiff flexible material that bows outwardly to some extent in response to pressure against the inside surfaces of the straight walls, a cover having a top wall and downwardly extending sides, and having grooves in the inside faces of the downwardly extending sides for engagement by the outwardly flaring top edges of the side walls of the dish, the pressure of the top edges of the side walls into the grooves being increased by outward bowing of the straight portions of the side walls and being increased by a deeper load of material in the dish exerting side pressure against the side walls of the dish.

2. A container assembly comprising a one piece plastic dish having a polygonal bottom and resilient side walls extending upwardly from the bottom and sloping outwardly as they extend upwardly and having outwardly flaring top edges, the side walls being substantially straight and joined at rounded corners of the dish, and a cover having a top wall and downwardly extending sides with grooves in the inside faces of the sides and into which the outwardly flaring top edges of the side walls engage, the pressure of the top edges of the side walls into the grooves being increased by outward bowing of the straight portions of the side walls and being increased by a deeper load of material in the dish exerting side pressure against the side walls of the dish.

3. A container assembly comprising a dish having a bottom and resilient side walls extending upwardly from the bottom and having outwardly flaring top edges, the bottom being polygonal and the side walls substantially straight and merging with the bottom and with each other at corners of the container, and the side walls being made of stiff flexible material that bows outwardly to some extent in response to pressure against the inside surfaces of the straight walls, and a cover having a top wall with downwardly extending sides and grooves in the inside faces of the sides engaged by the outwardly flaring top edges of the side walls of the dish, the sides which extend downwardly from the top wall being shaped so that they converge below the grooves to form a throat having a cross section less than the cross section of the undistorted top edges of the dish, and the sides flaring outwardly below the throat to provide a flaring entrance through which the top edges of the dish pass toward the throat where the flaring top edges are distorted as the cover is placed on the dish for subsequent movement of the top edges into the grooves in the inside faces of the sides of the cover.

4. A container assembly comprising a plastic dish of one-piece construction and having polygonal bottom and resilient side walls extending upwardly from the bottom and sloping outwardly as they extend upwardly, the side walls being substantially straight and joined by rounded corners and having outwardly flaring top edges, and a cover having a top wall and downwardly extending sides with grooves in the inside faces of the sides and into which the outwardly flaring top edges of the side walls of the dish engage when the side walls are in their normal undistorted positions, the sides which extend downwardly from the top wall of the cover being shaped so that they extend closer together below the grooves, and being shaped so that at a still lower level the confronting faces of said sides flare outwardly away from one another to provide a wide entrance for receiving the top edges of the dish when the dish and cover are brought together to assemble them with one another, the pressure of the top edges of the side walls into the grooves being increased by outward bowing of the straight portions of the side walls and being increased by a deeper load of material in the dish exerting side pressure against the side walls of the dish.

5. The container assembly described in claim 4 and in which the cover is made of plastic material and of one piece construction, and the cover is stiffened around its outer edge portion by a ridge on the top wall of the cover near the juncture of the top wall with the downwardly extending sides that have the grooves in which the flaring top edges of the side walls of the dish engage.

References Cited in the file of this patent

UNITED STATES PATENTS

| | | |
|---|---|---|
| 1,972,895 | Maccoy | Sept. 11, 1934 |
| 2,487,400 | Tupper | Nov. 8, 1949 |
| 2,614,727 | Robinson | Oct. 21, 1952 |
| 2,695,115 | Roop | Nov. 23, 1954 |
| 2,695,645 | Tupper | Nov. 30, 1954 |
| 2,711,840 | Gits et al. | June 28, 1955 |
| 2,726,517 | Pruett | Dec. 13, 1955 |